March 8, 1955 K. G. BROWN 2,703,595
SEED POTATO CUTTING MACHINE
Filed Aug. 18, 1952 3 Sheets-Sheet 1
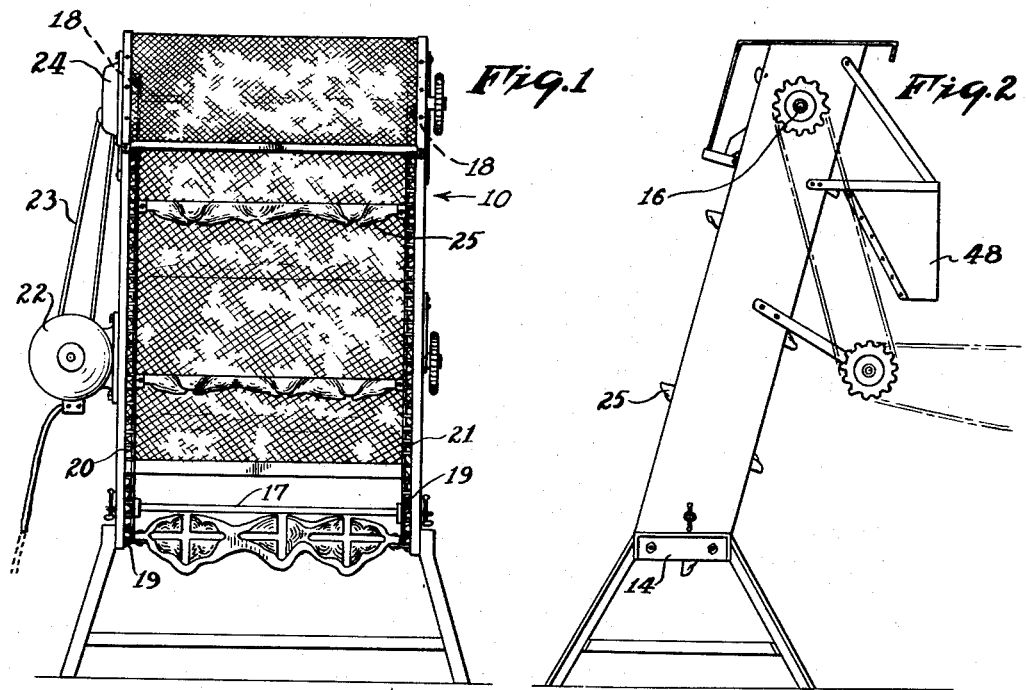
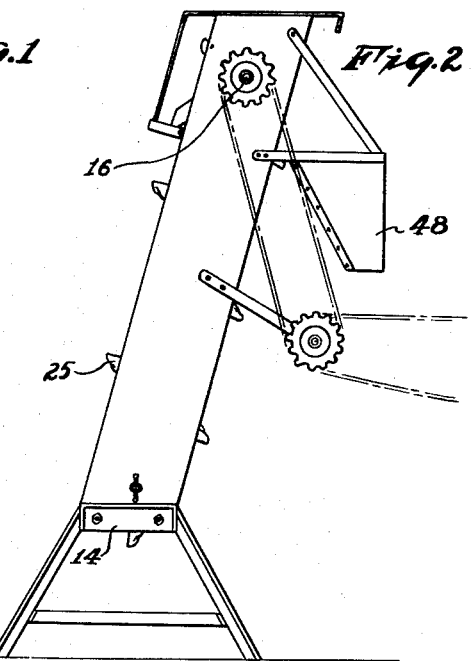
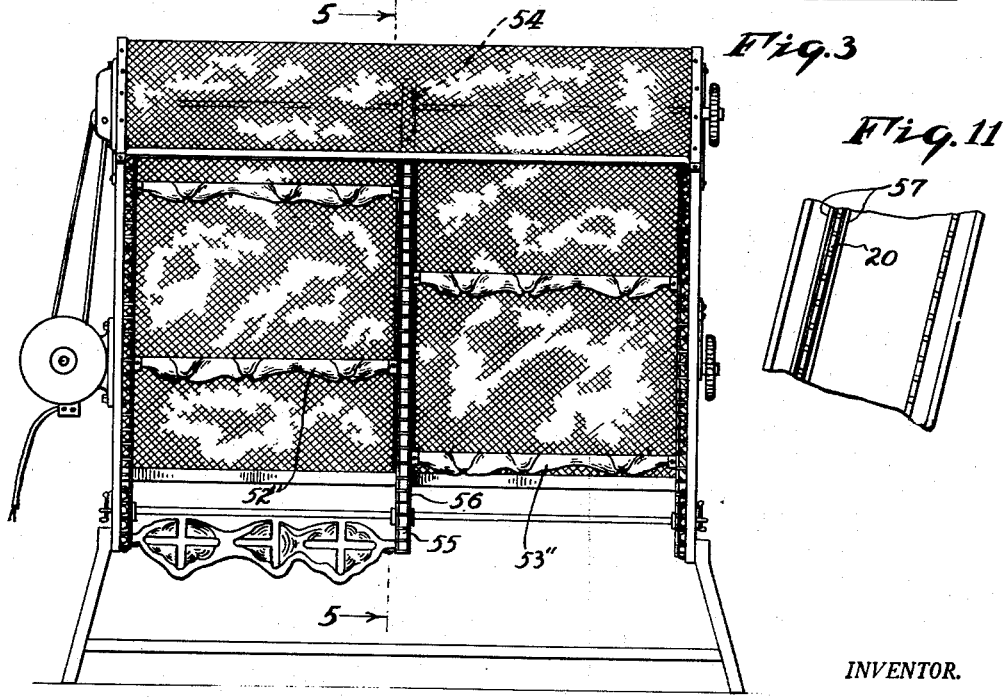
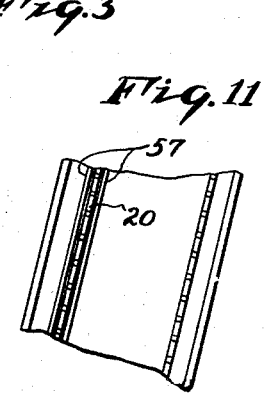
INVENTOR.
KENNETH G. BROWN
BY
Wm Thomas Jones
ATTORNEY March 8, 1955  K. G. BROWN  2,703,595
SEED POTATO CUTTING MACHINE
Filed Aug. 18, 1952  3 Sheets-Sheet 2
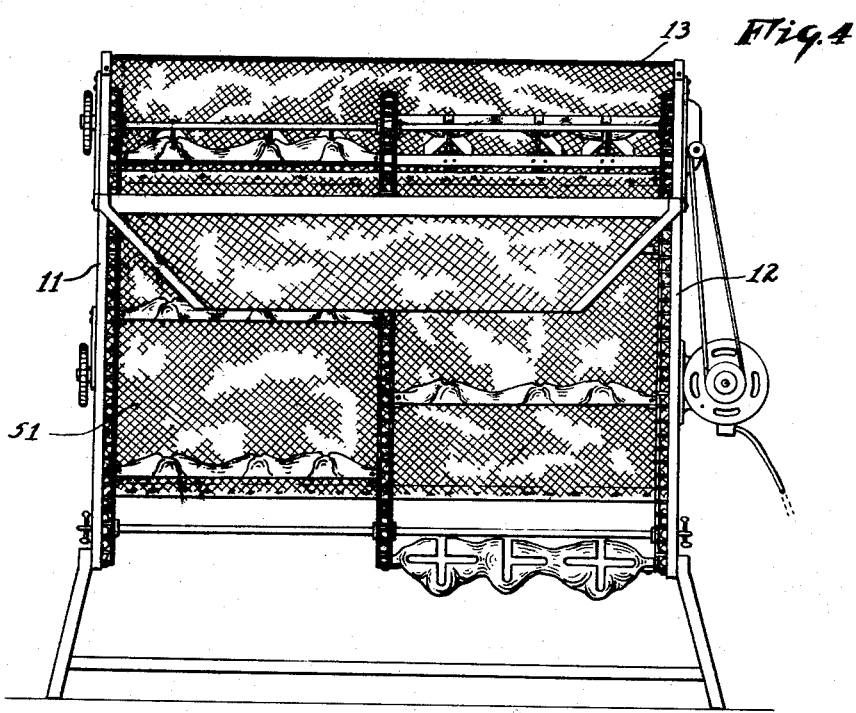
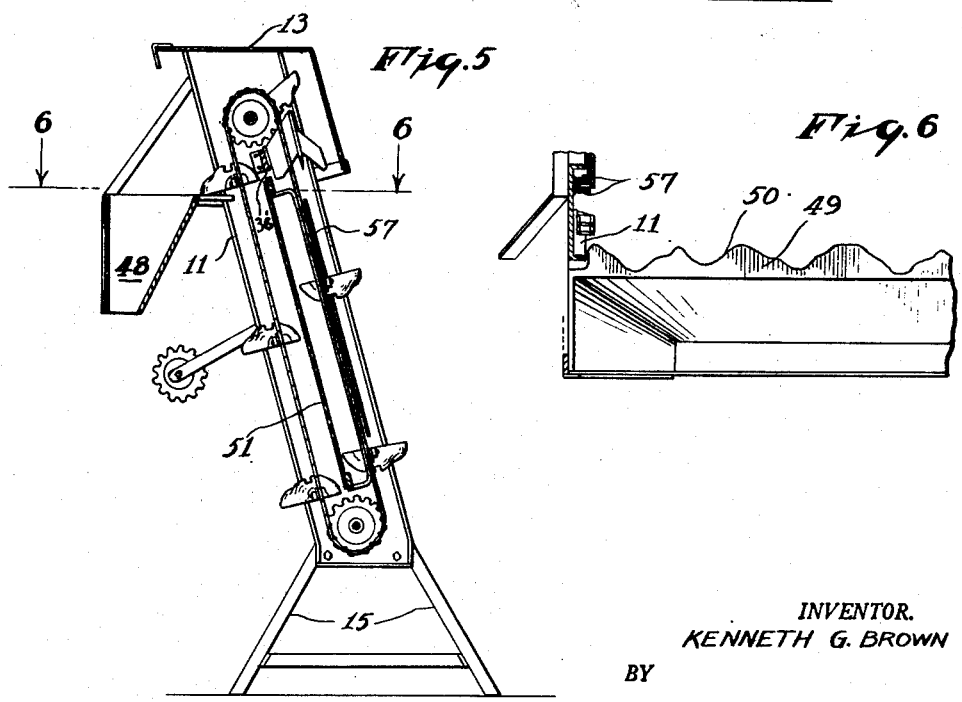
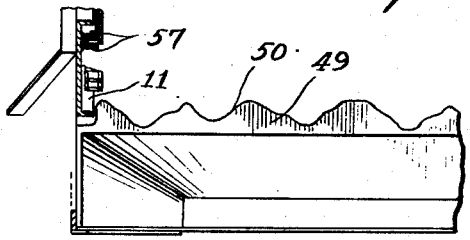
INVENTOR.
KENNETH G. BROWN
BY
ATTORNEY March 8, 1955 K. G. BROWN 2,703,595
SEED POTATO CUTTING MACHINE
Filed Aug. 18, 1952 3 Sheets-Sheet 3

INVENTOR.
KENNETH G. BROWN
BY
Wm Thomas Jones
ATTORNEY

_United States Patent Office_

2,703,595
Patented Mar. 8, 1955

2,703,595

SEED POTATO CUTTING MACHINE

Kenneth G. Brown, Mattituck, N. Y.

Application August 18, 1952, Serial No. 304,967

2 Claims. (Cl. 146—163)

This invention comprehends certain improvements in my patent relating to a Potato Seed Cutting Machine, No. 2,535,261, dated December 26, 1950, and in which gang carriers containing potatoes are advanced in a horizontal plane against a bank of knives for appropriate cutting.

As the outcome of extensive experiments which I have conducted, it has been definitely determined that if the machine is designed for operation in a substantially vertical plane, superior results are obtainable. For example, the potatoes are more postively nestled in the pockets of the gang carriers and are presented to the bank of knives without likelihood of their being displaced; the carriers are enabled to be made shorter and sturdier than my original carriers without seriously affecting their capacity.

I have also devised a novel form of carrier which makes for greater equalization of pressure as the potatoes are presented to the cutting action of the knives. Further, the novel principle of providing a vertical machine lends itself to manufacturing either a single stand or a double stand machine, and particularly in respect of the latter, carrying out still further the principle of equal distribution of pressure by staggering the mounting of the carriers. Also, vertical stands occupy minimum space and allow for the positioning of a feeding conveyor in the front and a discharge conveyor in the rear without undue crowding.

With these and other objects in view, the invention comprises certain novel features of construction as hereinafter described and claimed.

In the accompanying drawings:

Fig. 1 is a front elevation of one form of my invention—the single stand type, and Fig. 2 is an end elevation thereof.

Fig. 3 is a front elevation of the double stand type, and

Fig. 4 is a rear elevation thereof.

Fig. 5 is a vertical sectional elevation along lines 5—5 of Fig. 3.

Fig. 6 is a fragmentary transverse section taken on lines 6—6 of Fig. 5.

Fig. 11 is an enlarged detailed fragmentary view of the chain track.

Figure 7:
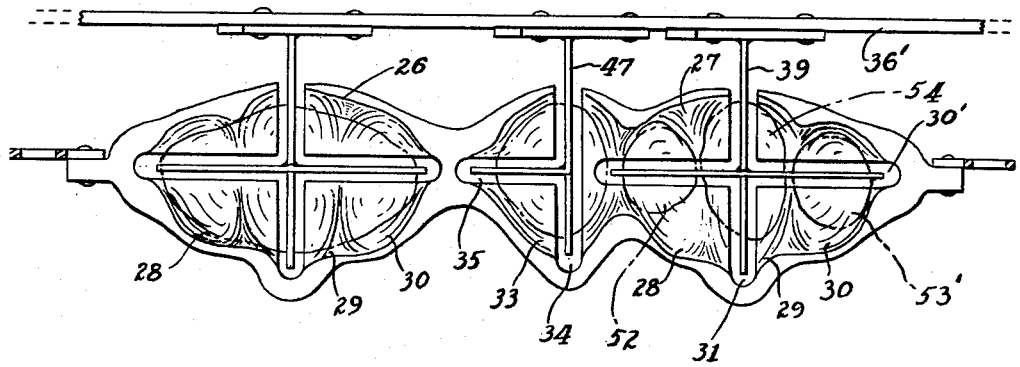
Fig. 7 is an enlarged top plan detailed view of a carrier showing the position of the bank of knives with respect thereto.
Figure 8:
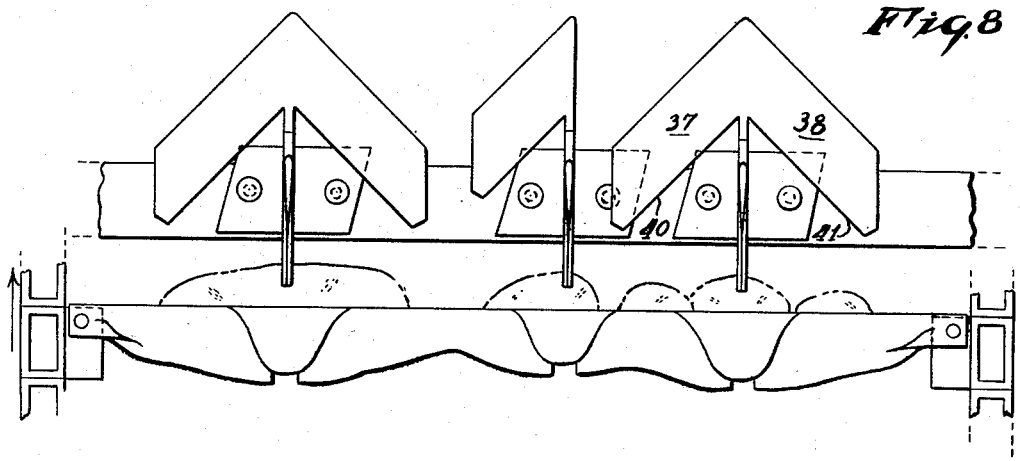
Fig. 8 is a similar view of the bank of knives.

Referring more particularly to the drawings, 10 designates a substantially vertical rectangular frame or stand, having parallel side members 11—12 connected at the top by the screen 13 and at the bottom by the base frame 14 from which latter depend legs 15.

Transverse shafts 16—17 are journalled at opposite ends of the side members 11—12 and terminally equipped with sprockets 18—19, over which are trained chains 20—21. A motor 22 is mounted adjacent the bottom of member 11 and connected by a belt 23 to a reduction gear 24 suitably meshed with shaft 16.

Figure 9:
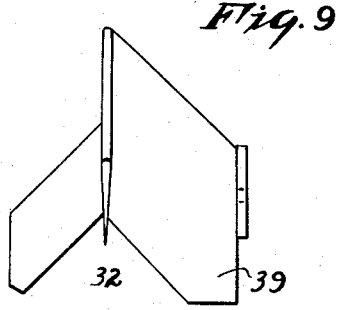
Fig. 9 is an enlarged side elevation of one of the end knives.

Disposed transversely of the chains in spaced relationship are a plurality of carriers 25, each of which comprises an integral casting. (See Fig. 7.) At opposite ends of each carrier are elongated master pockets 26—27. In turn, each master pocket is provided with ancillary transverse pockets 28—29 and 30, of graduated size. The master pockets receive potatoes of maximum size, while the ancillary pockets constitute nesting recesses for smaller potatoes. Extending longitudinally and transversely of the bottom of the master pocket are intersecting slots 30'—31, through which the knives 32, as shown in Fig. 9, pass.

Figure 10:
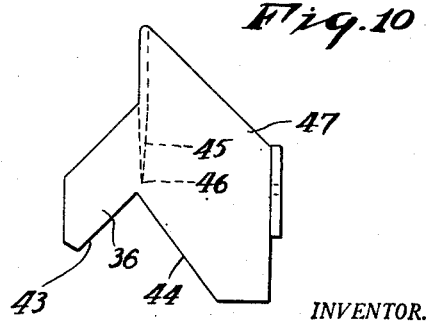
Fig. 10 is a similar view of the intermediate knife.

Intermediate the master pockets is still another pocket 33 for potatoes which are desired to be cut into three pieces. The bottom of this pocket has a slot 34 with a single laterally projecting intersecting slot 35. A knife 36, such as depicted in Fig. 10, supplies the cutting action with respect to this type of potato.

The bank of knives is rigidly fixed to a cross-bar 36' extending between the side members 11—12 of the stand near the top thereof and beneath the screen 13. Each knife 32 consists of a pair of superposed arrow-headed blades 37—38 carried by a bracket 39 at right angles to each other with their cutting edges 40—41 underneath. Knife 36 is similar in that the lower blade 42 is arrow-headed with cutting edges 43—44, but above its top only a single blade 45 is presented, having edge 46 disposed downwardly at an angle from bracket 47.

With either the single stand or the double stand, a hopper 48 is provided at the top of the rear to receive and deflect the cuttings to an endless conveyor (not shown). In this connection, I find it desirable to employ a baffle plate 49 at the top of the hopper and with its inner edge 50 curved to conform to the corresponding edge of the carriers (Fig. 6). A screen 51 may also be mounted between the reaches of the chains to protect the parts from the accumulation of dirt and other foreign matter.

As indicated in Fig. 7, two small potatoes 52—53' and one larger potato 54 may be inserted in master pocket 27, a medium sized potato in pocket 33 and a single large potato in master pocket 26, or this arrangement with reference to the master pockets may be reversed, just so long as the equalization of weight factor is maintained. As the loaded carriers proceed upwardly against the bank of knives, the potatoes are sliced into the appropriate number of parts in an obvious manner and are precipitated into hopper 48 as the carriers rotate into a bottom-side-up position about sprockets 18. So much for the operation of the single stand.

The double stand illustrated in Figs. 3, 4 and 5, involves the same general principle of operation with the exception that two sets of carriers 52''—53'' are utilized. This modified form of the invention necessitates widening of the frame, lengthening of the shafts, the addition of medial sprockets 54—55 and a co-operative chain 56. Further, the sets of carriers are disposed in staggered relation to the medial chain and the two outside chains to avoid undue strain on the knives. Manifestly, such type of stand insures greater production.

In either the single or double stand, the front of the outside chains are prevented from lateral movement by the addition of vertical metallic strips 57 (Fig. 11). In turn, wabbling of the carriers is avoided.

In some parts of the United States, particularly in the West, potatoes are exceptionally large and must be severed into a multiplicity of pieces. While not shown, it is obvious that my machine may be readily adapted to take care of this contingency without departing from the spirit of the invention.

I claim:

1. A machine for dividing articles such as seed potatoes in a number of pieces, comprising a rectangular frame disposed upright at a slight inclination from the vertical, a pair of endless chains supported within said frame, at least one carrier carried by and between the chains transversely of the frame, said carrier comprising an elongate rigid body having appreciable depth and having a flat top surface lying in one plane from end to end and from one longitudinal side to the other, the body having at least one pocket therein, said pocket being provided with at least one slot through the bottom and one side thereof, a knife having a cutting edge adjacent to the top of the frame and disposed in registration with said slot.

2. The invention according to claim 1, with a hopper disposed across the side of the frame opposite from the knife and below the top ends of the chains to receive cut pieces of articles from the pockets after the latter have moved over the tops of the chains, and a flat baffle fixed between a top edge of the hopper and the chains for deflecting cut pieces into the hopper, the baffle having the edge thereof nearest to the chains contoured to conform to the contour of the side of the pocket passing thereby.

References Cited in the file of this patent

UNITED STATES PATENTS

| | | |
|---|---|---|
| 1,274,042 | Holt | July 30, 1918 |
| 2,535,261 | Brown | Dec. 26, 1950 |

FOREIGN PATENTS

| | | |
|---|---|---|
| 624,961 | France | Apr. 16, 1927 |